United States Patent [19]

Bod et al.

[11] 4,085,512

[45] Apr. 25, 1978

[54] LUMBER CUTTING MEASUREMENT APPARATUS AND METHOD

[75] Inventors: Dennis Lee Bod, Federal Way; Kale Franklin Skutley, Seattle, both of Wash.

[73] Assignee: The Boeing Company, Seattle, Wash.

[21] Appl. No.: 754,137

[22] Filed: Dec. 27, 1976

[51] Int. Cl.² .................... G01C 15/06; G01B 11/30
[52] U.S. Cl. ........................................ 33/293; 33/286; 356/120
[58] Field of Search ............... 33/293, 294, 295, 296, 33/276, 278, 286; 356/120, 156; 73/81

[56] References Cited

U.S. PATENT DOCUMENTS

| | | |
|---|---|---|
| 2,840,913 | 7/1958 | Houser .................................. 33/295 |
| 3,498,120 | 3/1970 | MacMillan .............................. 73/81 |
| 3,775,929 | 12/1973 | Roodvoets ............................. 33/286 |

*Primary Examiner*—Steven L. Stephan
*Attorney, Agent, or Firm*—Daniel T. Anderson; Bernard A. Donahue

[57] ABSTRACT

Method and apparatus are disclosed for determining the straightness of a lumber cut. A transit type of precision telescope is positioned to view in a vertical sweep plane essentially parallel to that of the cut surface of the timber stock on the log carriage. A hand held scale is placed against the cut surface with a constant, spring controlled force in a plurality of positions distributed over the cut surface. The scale is read by the telescope in each position and the readings compared to determine the degree of straightness of the saw cut.

2 Claims, 4 Drawing Figures

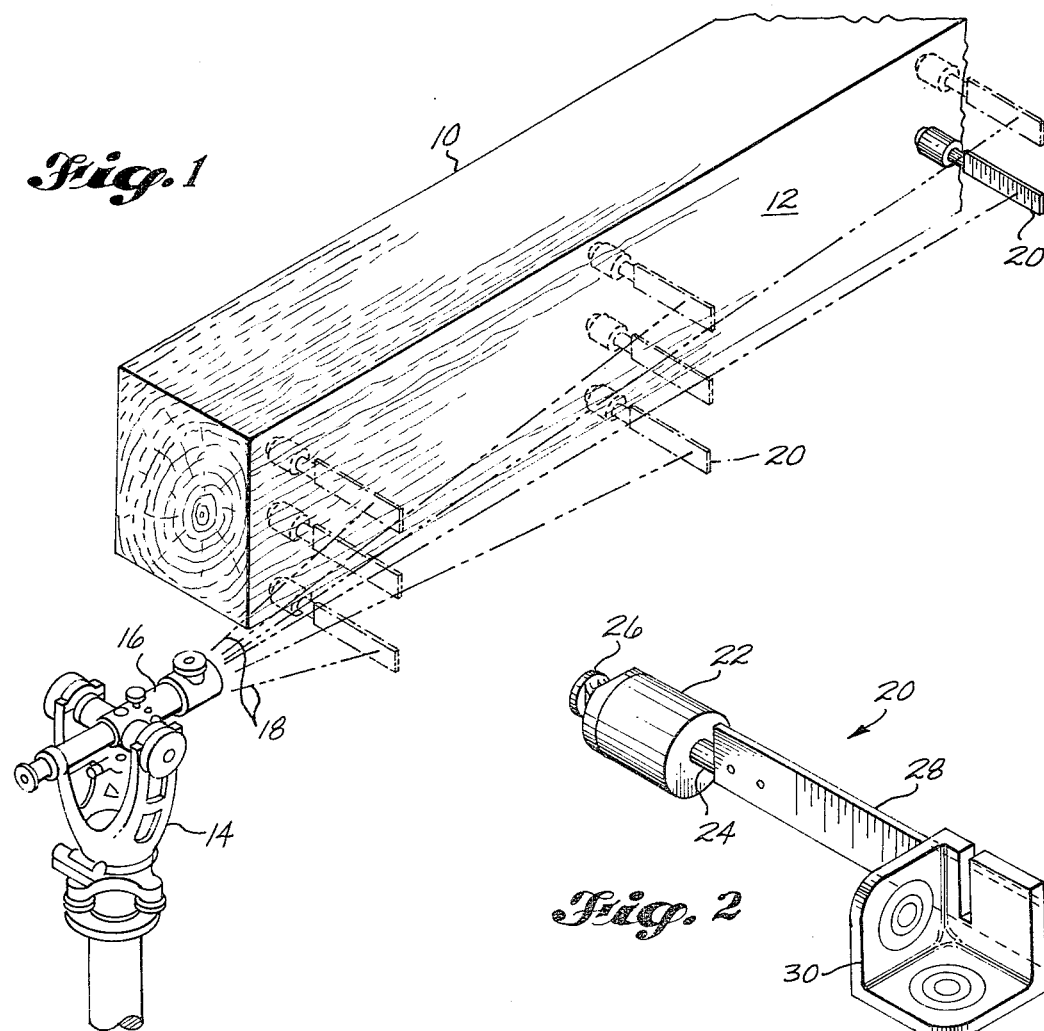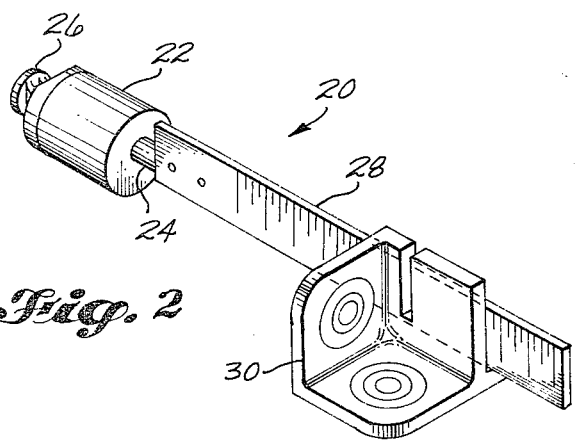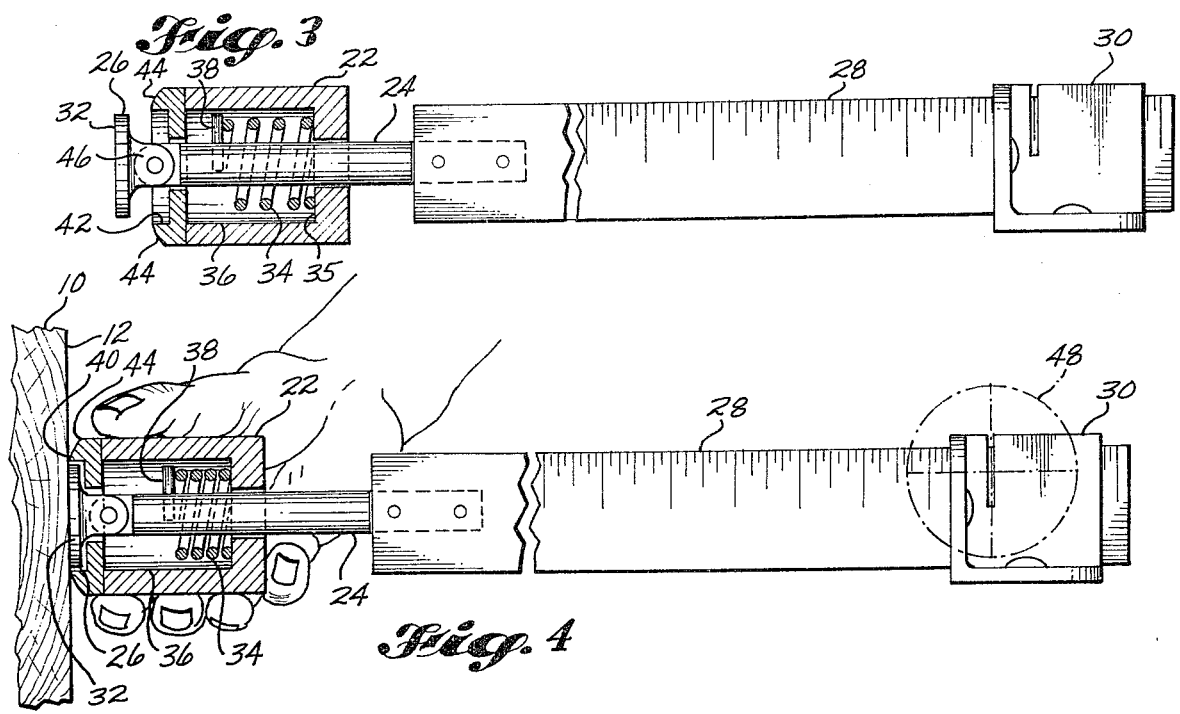

LUMBER CUTTING MEASUREMENT APPARATUS AND METHOD

BACKGROUND OF THE INVENTION

This invention relates generally to remote measuring and more specifically to apparatus and a method for determining in a production lumber mill the straightness of cut of a saw with respect to a length of timber stock.

Because of the high cost of lumber materials and the awareness in current times of the extreme importance of conservation of natural resources, it has been observed that the straightness of cut of large production saws in lumber mills is a very significant factor in the amount of wasted wood in the output of large saw mills. That is, the more uneven or nonstraight the cut of material from the raw timber stock, the more additional wood must subsequently be removed from the lumber surfaces in order to cause those surfaces to be satisfactorily true for their intended purposes in the consumer market. For every tenth of a millimeter of increased straightness, it is estimated that thousands of board-feet are saved in the annual production of a large sawmill.

In order to set and maintain the sawing machinery in a manner to minimize the waste of material, it is essential that the straightness of cut be measured, then monitored and adjusted to achieve consistently maximum straightness for the cutting operation.

Previous known approaches to obtaining, in an economic and practical manner, measurements of straightness of cut to the necessary degree of precision are not satisfactory. The primary reason for this lack of satisfactory precision is that inherently a plurality of readings across the surface of the cut must be taken; and the fuzz and relative softness of the freshly cut surface material made it impossible to obtain "repeatability" of measurement within, at best, the order of a millimeter.

Accordingly, it is an object of the present invention to provide a lumber cutting measurement apparatus and method which is not subject to these and other limitations of the prior art.

It is another object to provide such apparatus with which a plurality of surface measurements may be taken with very high repeatability of reading.

It is another object to provide such apparatus in which the precision requiring steps in measuring are achieved by optical instruments mounted safely and remotely from the sawing operation.

It is another object to provide such apparatus and method which are simple, reliable, inexpensive, and operable by relatively unskilled operators.

SUMMARY OF THE INVENTION

Briefly, these and other objects are achieved in an example of the present invention by providing a system including an optical jig transit remotely mounted to sight along a vertical swept plane parallel and juxtaposed to the cut face of a timber on the saw carriage. A novel spring loaded scale having a constant force, workpiece contacting end is provided which may be hand held against the cut face at a plurality of points distributed thereover. The scale is graduated along its length normal to the planes of saw cut and transit sweep, the reading taken in each instance being the distance between the transit sweep plane and the point on the cut face contacted by the spring loaded scale end. When the set of data for the cut is recorded, it may then readily be analyzed and processed to provide the desired determination of the magnitude and any other characteristics of straightness.

The spring loaded scale, in this example, has a body with a forward workpiece contacting end and a measurement shaft which is carried therewithin and projects forwardly thereof with a workpiece contacting, spring loaded face. The other end of the shaft protrudes rearwardly and includes the axially graduated scale. The shaft is essentially rigid and unitary from its workpiece contacting face to its rearwardly extending scale, is carried by the outer body and is urged forwardly against the workpiece with a repeatably constant force by a spring also carried within the body in, in this example, compressive engagement between the shaft and the body.

Other aspects of the structural and method features as well as additional objects and advantages of the invention will be manifest from the following description of the drawings; the description being of an example selected to illustrate as concisely and clearly as possible the concepts and operation of the invention. Other embodiments and examples and features within the scope of the claims will be apparent to an artisan in the mechanical and optic arts.

BRIEF DESCRIPTION OF THE DRAWINGS

FIG. 1 is a perspective view of an example of a lumber cutting measurement apparatus of the present invention and its method of operation;

FIG. 2 is a perspective view of an example of a scale holder constructed in accordance with the principles of the present invention;

FIG. 3 is a side elevational view thereof shown partially in section; and

FIG. 4 is a similar view thereof illustrating its configuration while in operation.

DETAILED DESCRIPTION OF A PREFERRED EMBODIMENT

In the example of FIG. 1, a cut piece of timber stock 10 is shown as it would be mounted on the saw carriage, not shown. The vertical face 12 of the timber may be taken as the surface of the saw cut which is to be measured for straightness. A jig transit 14 of the character including an optical micrometer is indicated as mounted remotely with its telescope 16 fixed to sweep in the vertical plane 18 which is essentially parallel to the cut face 12, and juxtaposed therefrom by a distance, in this example, of approximately 20 centimeters.

Also illustrated in FIG. 1 is a scale holder assembly 20 which, in phantom representation, is indicated as having been placed against the workpiece cut face surface 12 in a network of positions distributed thereover as shown. Typically the portions are separated by approximately one half meter and are taken along the length at the top, bottom, and center portion of the cut 12. In operation, the plurality of readings would be recorded, then analyzed and processed to provide the desired information concerning the character of the cut.

In FIG. 2, the scale holder assembly 12 is illustrated in somewhat enlarged detail. A body portion 22 of the character to be hand held against the surface 12 carries a measurement shaft 24 which is essentially a unitary structure from its work face contacting, or indexing foot, forwward end 26 to its axially graduated rearwardly extending scale 28. The shaft 24 is restrained, by conventional means, not shown, from rotation about its axis, with respect to the body portion 22; but has a freedom of axial movement along the length of the body portion. The latter movement is limited and is spring biased forwardly as described infra. A two orthagonal bubble type sliding scale level 30 is shown affixed to the scale 28 for determining that the scale is in a vertical plane and is horizontally extended between the cut surface and viewing planes, 12, 18.

Referring to FIG. 3, the internal structure of the scale holder body portion 22 is illustrated. The measurement shaft 24 is seen terminating, at its forward end, in a workpiece surface contacting face 32 and, at its rearward end, in the graduated scale 28. A coil spring 34 is shown compressively retained between the rear face 35 of a chamber 36 and a retaining pin 38 affixed in the shaft 24. Thus the indexing foot or instrument face 32 is normally urged outwardly, as shown, forwardly of the workpiece contacting forward end 40 of the body portion 22.

The forward end 40 of the body portion 22 is formed to provide a recess 42 to permit the withdrawal thereinto of the forward face 32 of the indexing foot of the measurement shaft 24 when both the ends 40, 32 are pressed by the operator against the surface 12 of the workpiece 10. The forward end of the body portion 22 is further relieved in radiused upper and lower surfaces 44 whereby the scale holder assembly 20 may be adjusted rotationally about the indexing foot in a vertical plane by operator reference to the scale level 30. To aid further in this respect, a swivel 46 may be provided, as shown, in the shaft 24 contiguously to the indexing forward end 26 of the measurement shaft 24. The swivel 46 permits the aforementioned vertical adjustment motion without affecting the precision contact of the instrument surface 32 to the workpiece surface 12.

It may be noted that the area of the contacting face 32 should be optimized between being, on the one hand, so large as to undesirably integrate and thereby mask some of the nonstraightness which is to be detected and measured and, on the other hand, being so small as to be adversely affected by minor fuzz or fibres or scratches or the like which are desirably to be masked or "integrated out" of the measurements. In practice, a pressure indexing foot surface 32 having an area of the order of approximately 7 to 10 square centimeters provides a desirable such optimum.

In FIG. 4, the instrument system is illustrated in operation. The operator is shown having grasped the body portion 22 of the scale holder assembly 20 and emplaced the indexing foot, front surface 32 in contact with the cut surface 12 of the timber 10. The operator presses the assembly forwardly until the front edge 40 of the body portion 22 is also in contact with the surface 12. At this point, the spring 34 is compressed and impresses an axial force on the shaft which is repeatably constant irrespective of all other parameters involved. When so emplaced, the operator at the transit reads the scale as indicated by the cross hairs pattern 48 in any of a number of conventional techniques.

In practice repeat readings to plus or minus 0.05 millimeters over a distance of 6 or more meters are readily obtained.

There has thus been disclosed and described an example of a lumber cutting measurement system and method which achieves the objects and exhibits the advantages set forth hereinabove.

We claim:

1. Lumber cutting measurement apparatus comprising:
   a body portion having
      a workpiece contacting, forward end, a rearward, scale end, with a longitudinal axis extending therebetween, and being of the character to be hand-held against a surface of said workpiece;
   measurement shaft means disposed partially within said body portion and being axially movable along said axis and having
      a workpiece contacting end face movable from a point axially outward from said workpiece contacting forward end of said body portion to a point axially therewithin;
   spring means carried by said body portion in axially forwardly urging engagement with said measurement shaft means for causing a compressive, with a repeatably constant force, contact between said workpiece contacting end face and said surface of said workpiece; and
   axially graduated scale means affixed to said measurement shaft means and extending axially rearwardly from said rearward, scale end of said body portion;
   said measurement shaft means further including articulation means disposed contiguously to said workpiece contacting end face for providing a rotational, swivel type freedom of adjustment movement of said measurement apparatus while maintaining said compressive contact between said end face and said workpiece.

2. The invention according to claim 1 in which said workpiece contacting, forward end of said body portion is formed to provide rotational clearance of said body portion about said end face of said measurement shaft means during any said adjustment movement of said measurement apparatus.

* * * * *